US006289123B1

(12) United States Patent
Xiaomang et al.

(10) Patent No.: US 6,289,123 B1
(45) Date of Patent: Sep. 11, 2001

(54) CHARACTER EXTRACTING METHOD AND ITS APPARATUS

(75) Inventors: Zhang Xiaomang, Tenri; Koichi Hatakeyama, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/112,014

(22) Filed: Jul. 8, 1998

(30) Foreign Application Priority Data

Jul. 8, 1997 (JP) ................................................ 9-182831

(51) Int. Cl.[7] .................................................... G06K 9/00
(52) U.S. Cl. ............................................................ 382/181
(58) Field of Search .................................... 382/181, 182, 382/183, 184, 185, 186, 187, 188, 189, 190, 173, 175, 177, 178, 179; 356/237, 430, 384, 73.1; 358/106, 75, 80, 280, 283

(56) References Cited

U.S. PATENT DOCUMENTS

| 4,905,296 | * | 2/1990 | Nishihara ................................ 352/42 |
| 4,926,251 | * | 5/1990 | Sekizawa et al. ...................... 358/75 |
| 5,172,421 | * | 12/1992 | Nakamura et al. ........................ 382/8 |
| 5,757,953 | * | 5/1998 | Jang ..................................... 382/132 |
| 5,903,676 | * | 5/1999 | Wu et al. .............................. 382/244 |

FOREIGN PATENT DOCUMENTS 2 505605    4/1996   (JP) .

* cited by examiner

Primary Examiner—Andrew W. Johns
Assistant Examiner—Seyed Azarian (57) ABSTRACT

A character extracting method includes the steps of: obtaining an image of a specific region; applying a Laplacian operation to the obtained image; binarizing an image resulting from the Laplacian operation; and separating and cutting a character on a character-by-character basis based on the binarized image.

22 Claims, 10 Drawing Sheets

| (i−1,j−1) | (i,j−1) |
|---|---|
| (i−1,j) | (i,j) |

*FIG. 4B*

| (i,j) | (i+1,j) |
|---|---|
| (i,j+1) | (i+1,j+1) |

*FIG. 4C*

| (i−1,j) | (i,j) |
|---|---|
| (i−1,j+1) | (i,j+1) |

*FIG. 4D*

| (i,j−1) | (i+1,j−1) |
|---|---|
| (i,j) | (i+1,j) |

| A | B | C |
|---|---|---|
| D | E | F |
| G | H | I |

FIG.9B

| 0 | 1 | 0 |
|---|---|---|
| 1 | −4 | 1 |
| 0 | 1 | 0 |

FIG.10

CHARACTER EXTRACTING METHOD AND ITS APPARATUS

BACKGROUND OF THE INVENTION

1. Field of the Invention

The present invention relates to a character extracting method conducted in preparation for character recognition, and a character extracting apparatus for conducting the same. More particularly, the present invention relates to a character extracting method, which is used in, for example, a pre-process of character recognition for managing the quality of industrial products in the field of factory automation in an automated manner on a production line, and a character extracting apparatus for conducting the same. For example, the above-mentioned pre-process is a process for cutting out a character(s) on a wafer on a character-by-character basis by a character recognition apparatus for the purpose of quality management of the wafers produced.

2. Description of the Related Art

According to the character recognition technique in the field of office automation, a clear image can be obtained from a document of interest. Therefore, the character recognition technique in the office automation has been reached a substantially high-level recognition ratio.

According to the character recognition technique in the field of factory automation, however, a back-ground-light level varies depending upon the operation environment. Therefore, the background of an object of interest is less distinct, making the difference between a character(s) and the background unclear. Accordingly, the character recognition would be difficult without conducting a number of pre-processes prior to a character recognition process.

A general character recognition apparatus for the factory automation conducts a character recognition process by correctly cutting out a character region, i.e., a portion where a character is drawn, using the image processing technology. Provided that the character recognition process for the factory automation is the same as that for the office automation, whether the character recognition succeeds or not is determined by the character extracting process which is conducted as a pre-process of the character recognition process. When the character region can be correctly extracted, a character(s) can be recognized with a high recognition ratio, using a character recognition method similar to that used in the office automation.

A "method using region information" and a "method using edge information" are becoming popular as methods for extracting (cutting) a character region from an image.

One example of the "method using region information" is to set a threshold reflecting a local characteristic of an image $I(i, j)$ (e.g., "Image Data Processing for Scientific Measurement" by Kawata et al., 1994, published by CQ Inc.).

The key to this threshold method is to properly select a threshold. A threshold T is given by, for example, the following expression (1):

$$T = \frac{1}{N} \sum_{i,j} \sum_{CP} I(i, j) \quad (1)$$

where P: a region;

N: the number of pixels in the region P;

I(i, j): a two-dimensional function representing an image; and (i, j): a pixel position in coordinates.

According to the above expression (1), a region P centered around an pixel (i, j) is provided on a pixel-by-pixel basis, and a mean concentration value of each region P is set as a threshold T.

A Marr's zero-cross method ("Vision" by D. Marr, 1982, published by W. H. Freeman Inc.) is well known as a method using edge information. According to the zero-cross method, a Laplacian operation is applied to an original image according to the following expression (2), and the point where the operation result changes from positive to negative (i.e., zero-cross) is extracted as an edge of a character:

$$\nabla^2 f \equiv \frac{\partial^2 f}{\partial x^2} + \frac{\partial^2 f}{\partial y^2} \quad (2)$$

where $\nabla^2$: a Laplacian operator;

f: a two-dimensional function of x and y; and (x, y): a pixel position in coordinates.

Alternatively, a method for first reducing the sharpness of the original image using a Gaussian function and then applying a Laplacian operation to the resultant image according to the following expression (3) is often used:

$$G(x, y) = 1/(2\pi\sigma^2)\exp(-(x^2+y^2)/(2\sigma^2)); \sigma > 0 \quad (3)$$

where G(x, y): a two-dimensional Gaussian function; and

σ: a spatial constant of the Gaussian function.

However, in the above-mentioned threshold method using region information, an importance level of the pixels in the region P is not considered on a pixel-by-pixel basis. In short, every pixel in the region P is regarded as being of the same importance. Moreover, every region P in the entire screen has the same size. Therefore, such a threshold T is not preferable. For such reasons as described above, a character (s) can not be precisely cut out by this threshold method. Consequently, such a high recognition ratio as obtained by the character recognition apparatus for office automation can not be expected.

SUMMARY OF THE INVENTION

According to one aspect of the present invention, a character extracting method includes the steps of: obtaining an image of a specific region; applying a Laplacian operation to the obtained image; binarizing the image resulting from the Laplacian operation; and separating and cutting a character on a character-by-character basis based on the binarized image.

In one example, in the binarizing step, in a case where a portion where a character to be cut out is drawn has a convex property, $I_b[i, j]$ is a first value when $\nabla^2 I_0[i, j] \geq 0$, and $I_b[i, j]$ is a second value when $\nabla^2 I_0[i, j] < 0$; and in a case where the portion where the character to be cut out has a concave property, $I_b[i, j]$ is the first value when $\nabla^2 I_0[i, j] \leq 0$, and $I_b[i, j]$ is the second value when $\nabla^2 I_0[i, j] > 0$, where $\nabla^2$ represents a Laplacian operator; [i, j] represents a pixel position in the image; $I_0[i, j]$ represents a pixel value corresponding to the pixel position [i, j]; and $I_b[i, j]$ represents a binarized pixel-value corresponding to a pixel value $I_0[i, j]$.

In one example, the first value corresponds to a level 0, and the second value corresponds to a level 255.

In one example, the convex property indicates such a property that the portion where the character to be cut out is drawn becomes brighter toward the center thereof, and the concave property indicates such a property that the portion where the character to be cut out is drawn becomes darker toward the center thereof.

In one example, a character extracting method further includes, after the binarizing step, the step of: filtering noise from the binarized image.

In one example, the step of filtering the noise from the binarized image uses an arbitrary pixel and a pixel adjacent to the arbitrary pixel in the binarized image to filter the noise from the arbitrary pixel.

In one example, the step of filtering the noise from the binarized image filters the noise by applying a minimum filter to a region having the arbitrary pixel and the adjacent pixel.

In one example, the step of filtering the noise from the binarized image filters the noise by applying an AND operation to a region having the arbitrary pixel and the adjacent pixel.

In one example, the step of filtering the noise from the binarized image filters the noise by applying a mean-value operation to a region having the arbitrary pixel and the adjacent pixel.

In one example, a character extracting method further includes, after the step of filtering the noise from the binarized image, the step of conducting an expansion process and/or a contraction process in order to shape a deformed character and/or to fill a hole which is present in the portion where the character to be cut out is drawn.

In one example, a character extracting method further includes, prior to the step of conducting the expansion process and/or the contraction process, the step of determining an outer frame of the character to be cut out.

In one example, a character extracting method further includes the step of calculating a logic product of an image resulting from the step of conducting the expansion process and/or the contraction process and an image resulting from the step of filtering the noise from the binarized image.

According to another aspect of the present invention, a character extracting apparatus includes: an imaging section for obtaining an image of a specific region; a Laplacian operation section for applying a Laplacian operation to the obtained image; a binarizing section for binarizing the image resulting from the Laplacian operation; and a cutting section for separating and cutting a character on a character-by-character basis based on the binarized image.

In one example, the binarizing section binarizes the image resulting from the Laplacian operation as follows: in a case where a portion where a character to be cut out is drawn has a convex property, $I_b[i,j]$ is a first value when $\nabla^2 I_0[i,j] \geq 0$, and $I_b[i,j]$ is a second value when $\nabla^2 I_0[i,j] < 0$; and in a case where the portion where the character to be cut out has a concave property, $I_b[i,j]$ is the first value when $\nabla^2 I_0[i,j] \leq 0$, and $I_b[i,j]$ is the second value when $\nabla^2 I_0[i,j] > 0$, where $\nabla^2$ represents a Laplacian operator; [i, j] represents a pixel position in the image; $I_0[i,j]$ represents a pixel value corresponding to the pixel position [i, j]; and $I_b[i,j]$ represents a binarized pixel-value corresponding to a pixel value $I_0[i,j]$.

In one example, the first value corresponds to a level 0, and the second value corresponds to a level 255.

In one example, the convex property indicates such a property that the portion where the character to be cut out is drawn becomes brighter toward the center thereof, and the concave property indicates such a property that the portion where the character to be cut out is drawn becomes darker toward the center thereof.

In one example, a character extracting apparatus further includes a filter for filtering noise from the binarized image.

In one example, the filter uses an arbitrary pixel and a pixel adjacent to the arbitrary pixel in the binarized image to filter the noise from the arbitrary pixel.

In one example, the filter filters the noise by applying a minimum filter to a region having the arbitrary pixel and the adjacent pixel.

In one example, the filter filters the noise by applying an AND operation to a region having the arbitrary pixel and the adjacent pixel.

In one example, the filter filters the noise by applying a mean-value operation to a region having the arbitrary pixel and the adjacent pixel.

In one example a character extracting apparatus further includes an image processing section for calculating a logic product of an image provided by an expansion process and/or a contraction process and an image output from the filter.

Thus, the invention described herein makes possible the advantages of (1) providing a character extracting method capable of substantially correctly cutting out a character region including a character(s) which is likely to contain a great amount of noise in the field of, for example, factory automation, and capable of ultimately achieving such a high recognition ratio as obtained by the character recognition process for office automation, and (2) a character segmentation apparatus for conducting the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings. The same reference numerals designate the same components.

The present invention will now be described with reference to FIGS. 1 to 10.

Figure 1:
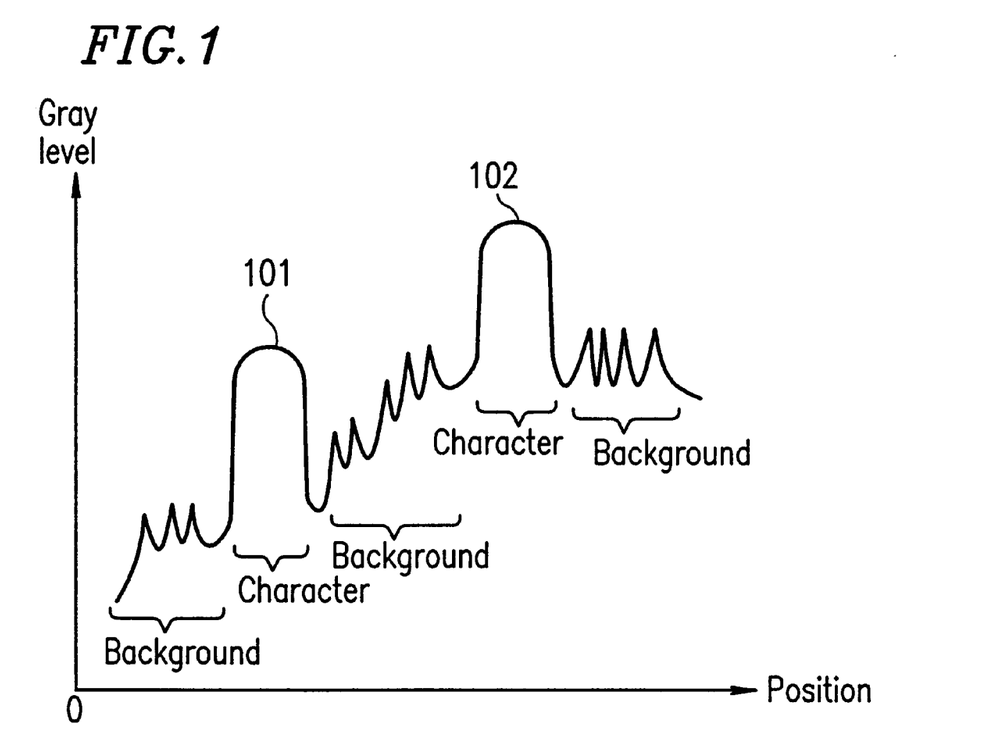
FIG. 1 is a graph showing a gray level of an image including characters with respect to a one-dimensional pixel position.

FIG. 1 is a graph showing a gray level of an image including characters with respect to a one-dimensional pixel position. In FIG. 1, the abscissa indicates a one-dimensional pixel position, and the ordinate indicates a gray level of a pixel. Each of two large convex-shaped portions 101 and 102 represents a portion where a character(s) to be extracted is drawn (hereinafter, this position is referred to as a character-drawn portion) and the other portions represent a background. It is herein assumed that the character(s) is white and the background is black. It should be noted that this character image of FIG. 1, which represents a character of the factory automation, has a digital gray-level image of 256 gradation levels. This character image is the darkest where a gray level (i.e., a pixel value) is zero, and is the brightest where a gray level is 255.

Figure 2A:
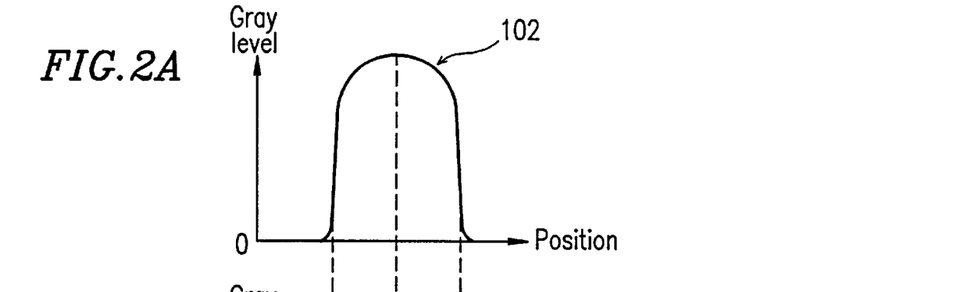
FIG. 2A is an enlarged graph showing only a character-drawn portion of the image shown in FIG. 1.

FIG. 2A is an enlarged graph showing only the character-drawn portion 102 of FIG. 1. As shown in FIG. 2A, one of the features of a character of the factory automation is that the character becomes brighter toward the center of the character-drawn portion. That is, the character has a convex-shaped gray-level profile (hereinafter, such a feature of the character is referred to as a convex property). The gray level of the character-drawn portion 102 reaches a peak at the center of the character-drawn portion 102, and gradually decreases away from the center toward the right and the left.

It should be noted that a character of the factory automation may have a property opposite to the convex property. More specifically, a character image may become darker toward the center of a character-drawn portion (hereinafter, such a property is referred to as a concave property). Regarding the gray level; the character-drawn portion in an image of the factory automation has a regular profile of the concave or convex property. However, a background (the other portions) has a mixed profile of the concave and convex properties.

Figure 2B:
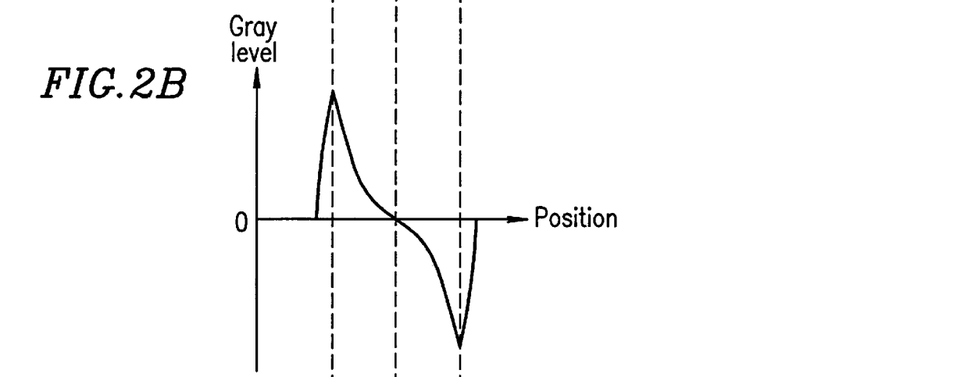
FIG. 2B is a graph showing the gray level of the character-drawn portion differentiated with a position of the character-drawn portion of FIG. 2A.
Figure 2C:
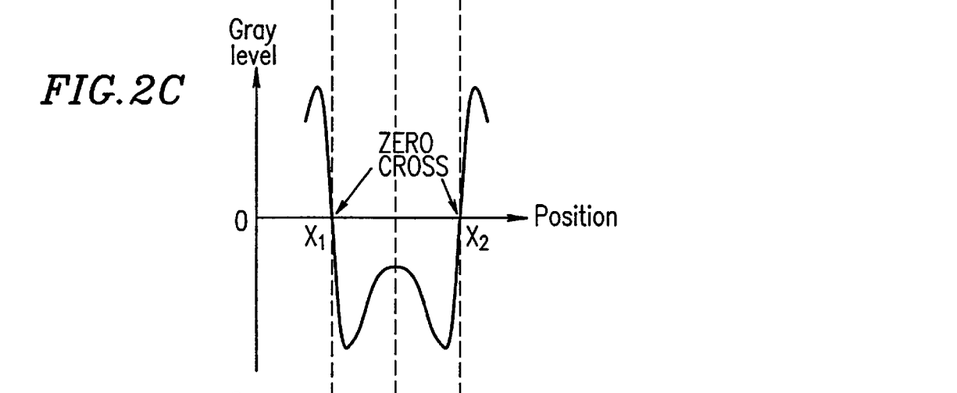
FIG. 2C is a graph showing the result of applying a Laplacian operation to the character-drawn portion in FIG. 2A.

FIG. 2B shows a slope of the gray level of the character-drawn portion 102. More specifically, FIG. 2B shows the gray level of the character-drawn portion 102 differentiated with a position of the character-drawn portion 102. FIG. 2C shows the result of applying a Laplacian operation to the character-drawn portion 102 (see the following expression (4)) in order to use a zero-cross method. Each of the intersections $X_1$ and $X_2$ of the straight line representing a gray level of zero and the curve representing the Laplacian operation result corresponds to an edge region of the character-drawn portion:

$$\nabla^2 I(i, j) = \frac{\partial^2 I}{\partial i^2} + \frac{\partial^2 I}{\partial j^2} \qquad (4)$$

where I(i, j): a two-dimensional function representing an image; and (i, j): a pixel position in coordinates.

Figure 2D:
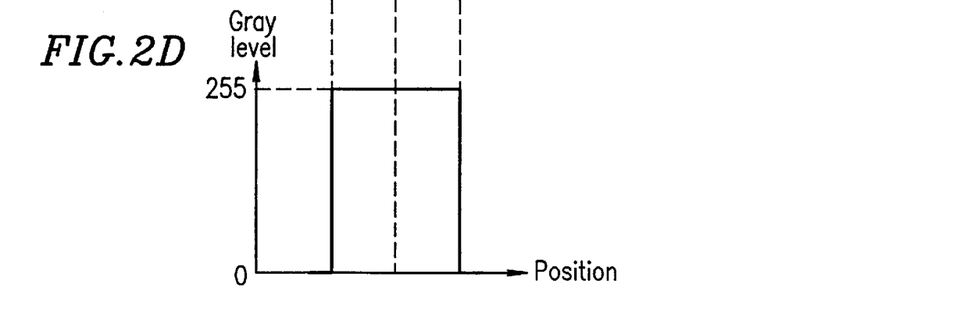
FIG. 2D is a graph showing the result of binarizing the Laplacian operation result shown in FIG. 2C.

FIG. 2D is a graph showing the result of binarizing the Laplacian operation result. According to this binarizing process, the Laplacian operation result is regarded as 255 when the Laplacian operation result is negative. The Laplacian operation result is regarded as zero when the Laplacian operation result is positive or zero.

The character region including the character-drawn portion is extracted by the above-mentioned binarizing process. This binarizing process is given by the following expression (5):

$$I_b[i][j] = \begin{cases} 0; & \nabla^2 I_0[i][j] \geq 0 \\ 255; & \nabla^2 I_0[i][j] < 0 \end{cases} \qquad (5)$$

where (i, j): a pixel position;

$I_0$: an original image; and $I_b$: a binarized image.

It should be noted that in the case of an image having a concave property, the binarizing process given by the following expression (6) is conducted:

$$I_b[i][j] = \begin{cases} 0; & \nabla^2 I_0[i][j] \leq 0 \\ 255; & \nabla^2 I_0[i][j] > 0 \end{cases} \qquad (6)$$

where (i, j): a pixel position;

$I_0$: an original image; and $I_b$: a binarized image.

By extracting a character region by using an inner region of a character-drawn portion, a phenomenon that the character region overlaps with the other unnecessary regions will be suppressed. This is because a character image having a convex property becomes brighter toward the center of the character-drawn portion 102, whereby the character region including a character-drawn portion can be easily distinguished from the other unnecessary regions.

According to the above-mentioned method, the character-drawn portion can be extracted. Since the Laplacian operation is directly applied to the original image, a high-frequency noise region having a convex property remains in the binarized image. However, the size of the remaining high-frequency noise region in the binarized image is smaller than that of the character region.

According to the present example, a minimum filter with a size of 2×2 pixels, for example, is applied to the binarized image in order to remove the noise region.

Figure 4A:
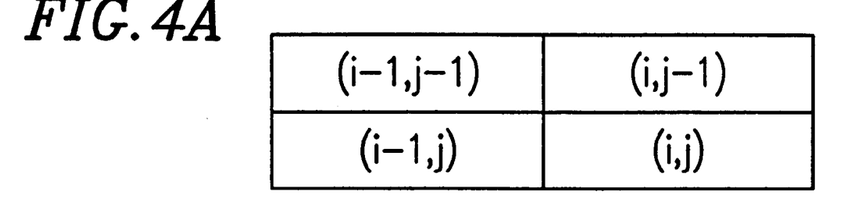
FIG. 4A to 4D are diagrams showing possible mask regions used in a 2×2 minimum-filtering process.
Figure 4B:
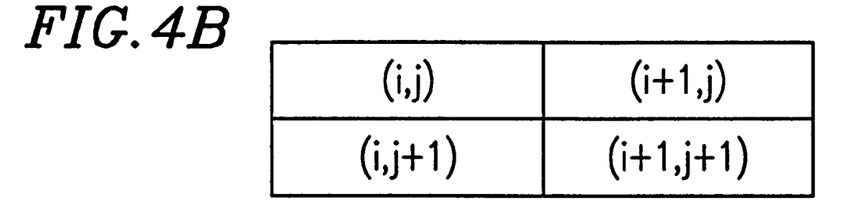
Figure 4C:
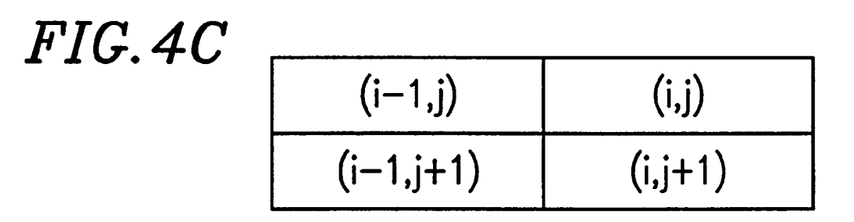
Figure 4D:
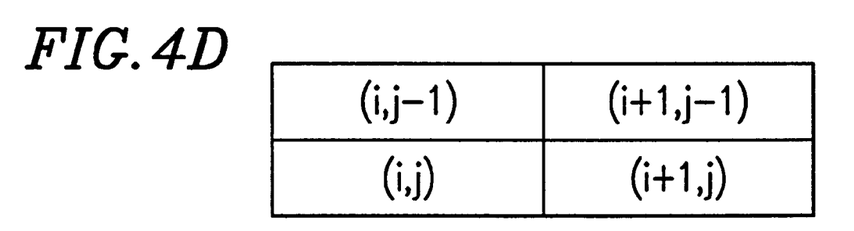

In the case of such a 2×2 mask size, four mask patterns are possible for a pixel of interest (i, j), as shown in FIGS. 4A to 4D. Any one of the four mask patterns is selected to define the filter. The filter (minimum filter) of the mask pattern shown in FIG. 4A is herein defined according to the following expression (7):

$$I_f[i][j]=\min\{Ib[i-1,j-1], Ib[i,j-1], Ib[i-1,j], Ib[i,j]\} \quad (7)$$

where $I_f$ is a filtered binarized-image.

In a filtering process described below in Example 2, a 2×2 mask is used. In a contraction process of contracting eight or four pixels, which is described below, a 3×3 mask is used. The eight pixels are those pixels which are located in the vicinity of a pixel of interest. The four pixels are those pixels which are located in the vicinity of a pixel of interest, for example, on upper, lower, right and left sides of the pixel of interest.

This filtering process is effective not only in reducing a small noise region, but also in cutting out a large unnecessary region from a character region. As described below, the other unnecessary regions can be removed by, for example, performing a logic product operation between images or calculating the respective areas of the unnecessary regions, based on the respective features of the unnecessary regions.

A character can be shaped by an expansion process and/or the contraction process, so that the character is formed and a hole in the character-drawn portion is eliminated. For illustrating the expansion process and the contraction process, "Primer for Computer Image Processing", pp. 76–77, edited by Tamura and published by Soken Shuppan is herein incorporated by reference.

When the expansion process and/or the contraction process are conducted, the characters are more likely to be in contact with each other. Therefore, frames circumscribing the respective characters are determined prior to the expansion process and/or the contraction process. Then, the determined frames are used after shaping the characters.

In the examples of the present invention, a character region is extracted from an image through the processes shown in FIGS. 2A, 2C and 2D, based on the above-mentioned properties.

EXAMPLE 1

Hereinafter, a character extracting apparatus according to Example 1 of the present invention will be described with reference to FIG. 5.

Figure 5:
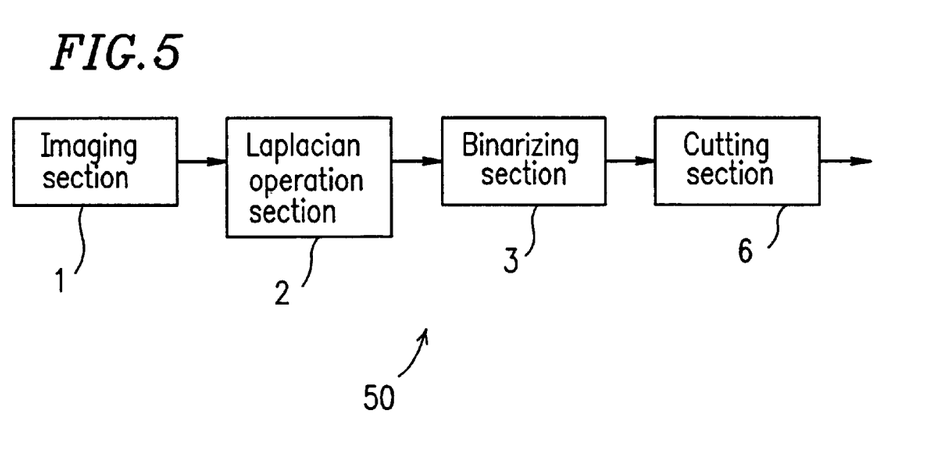
FIG. 5 is a diagram showing a character extracting apparatus according to Example 1 of the present invention.

The character extracting apparatus 50 in FIG. 5 includes an imaging section 1 for obtaining an image of a specific region including a character(s), a Laplacian operation section 2 for applying an Laplacian operation to the obtained image, a binarizing section 3 for binarizing the Laplacian operation result, and a cutting section 6 for separating and cutting the character(s) on a character-by-character basis based on the binarized image.

The imaging section 1 has an imaging camera and an illumination apparatus. The imaging camera obtains an image of a region including a character(s). The character(s) is written on, for example, a wafer.

The Laplacian operation section 2 performs an operation denoted by the expression: $\nabla^2 I_0[i, j] = \partial^2 I/\partial i^2 + \partial^2 I/\partial j^2$.

The binarizing section 3 binarizes the result of the operation under the following conditions:

In the case where a portion where a character to be cut out is drawn, that is, a character-drawn portion has a convex property, $I_b[i, j]$ is a first value when $\nabla^2 I_0[i, j] \geq 0$, and $I_b[i, j]$ is a second value when $\nabla^2 I_0[i, j] < 0$; and in the case where the character-drawn portion has a concave property, $I_b[i, j]$ is a first value when $\nabla^2 I_0[i, j] \leq 0$, and $I_b[i, j]$ is a second value when $\nabla^2 I_0[i, j] > 0$. In the above expression, $\nabla^2$ represents a Laplacian operator, $[i, j]$ represents a pixel position in the image, $I_0[i, j]$ represents a pixel value corresponding to the pixel position $[i, j]$, and $I_b[i, j]$ represents a binarized pixel value corresponding to the pixel position $[i, j]$.

As described above, the convex property herein indicates such a property that the character-drawn portion becomes brighter toward the center thereof, and the concave property herein indicates such a property that the character-drawn portion becomes darker toward the center thereof.

Figure 6:
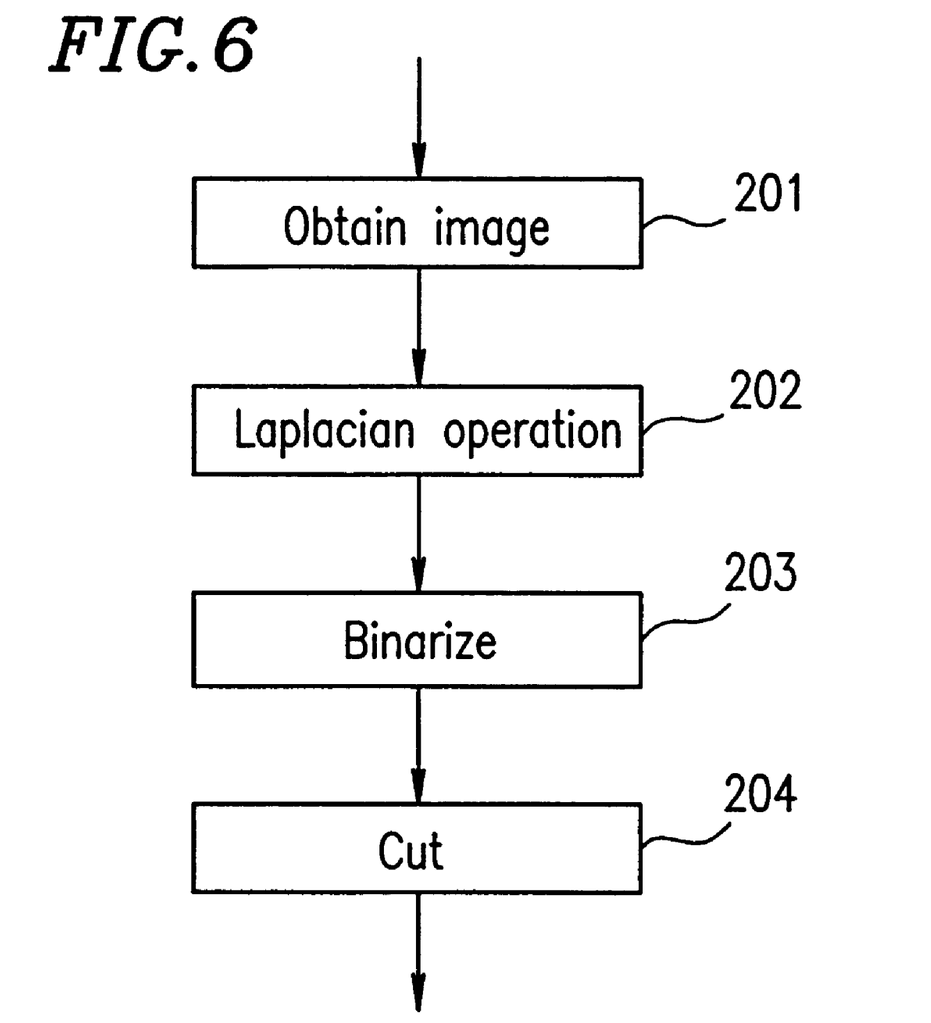
FIG. 6 is a flow chart illustrating a character extracting method according to Example 1 of the present invention.
Figure 7:
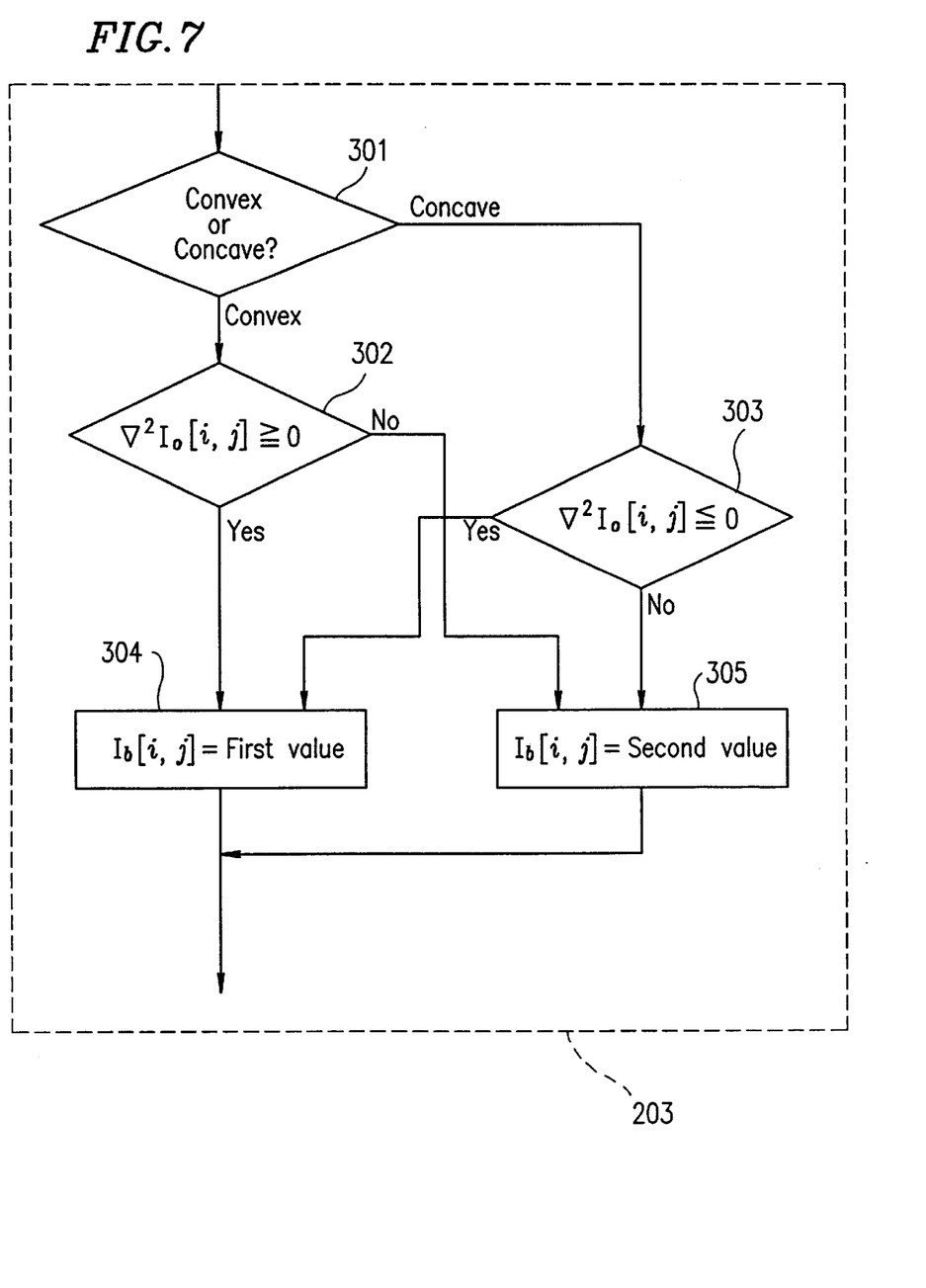
FIG. 7 is a flow chart illustrating Step 203 of the method in FIG. 6 in detail.

Hereinafter, a method for cutting out a character by the character extracting apparatus 50 according to Example 1 will now be described with reference to FIGS. 6 and 7.

In Step 201, an image of a specific region is obtained. The image of the specific region includes a background and a character-drawn portion. In Step 202, a Laplacian operation is applied to the image of the specific region. As described above, this operation is performed according to the expression: $\nabla^2 I_0[i, j] = \partial^2 I/\partial i^2 + \partial^2 I/\partial j^2$.

In Step 203, the Laplacian operation result is binarized. Then, a character(s) is extracted on a character-by-character basis, based on the binarized value, in Step 204.

Hereinafter, Binarizing Step 203 will be described in detail with reference to FIG. 7.

In Step 301, whether the character-drawn portion has a convex property or a concave property is determined.

In the case where the character-drawn portion has a convex property, the process proceeds to Step 302. In the case where the character-drawn portion has a concave property, the process proceeds to Step 303.

In Step 302, the process proceeds to Step 304 when $\nabla^2 I_0[i, j] \geq 0$, and proceeds to Step 305 when $\nabla^2 I_0[i, j] < 0$.

In Step 304, $I_b[i, j]$ is a first value of, for example, zero. In Step 305, $I_b[i, j]$ is a second value of, for example, 255.

In the case where the character-drawn portion has a concave property, the process proceeds to Step 303.

In Step 303, the process proceeds to Step 304 when $\nabla^2 I_0[i, j] \leq 0$, and proceeds to Step 305 when $\nabla^2 I_0[i, j] < 0$.

In Step 304, $I_b[i, j]$ is a first value of, for example, zero. In Step 305, $I_b[i, j]$ is a second value of, for example, 255.

EXAMPLE 2

A character extracting apparatus according to Example 2 of the present invention will now be described with reference to FIG. 8.

Figure 8:
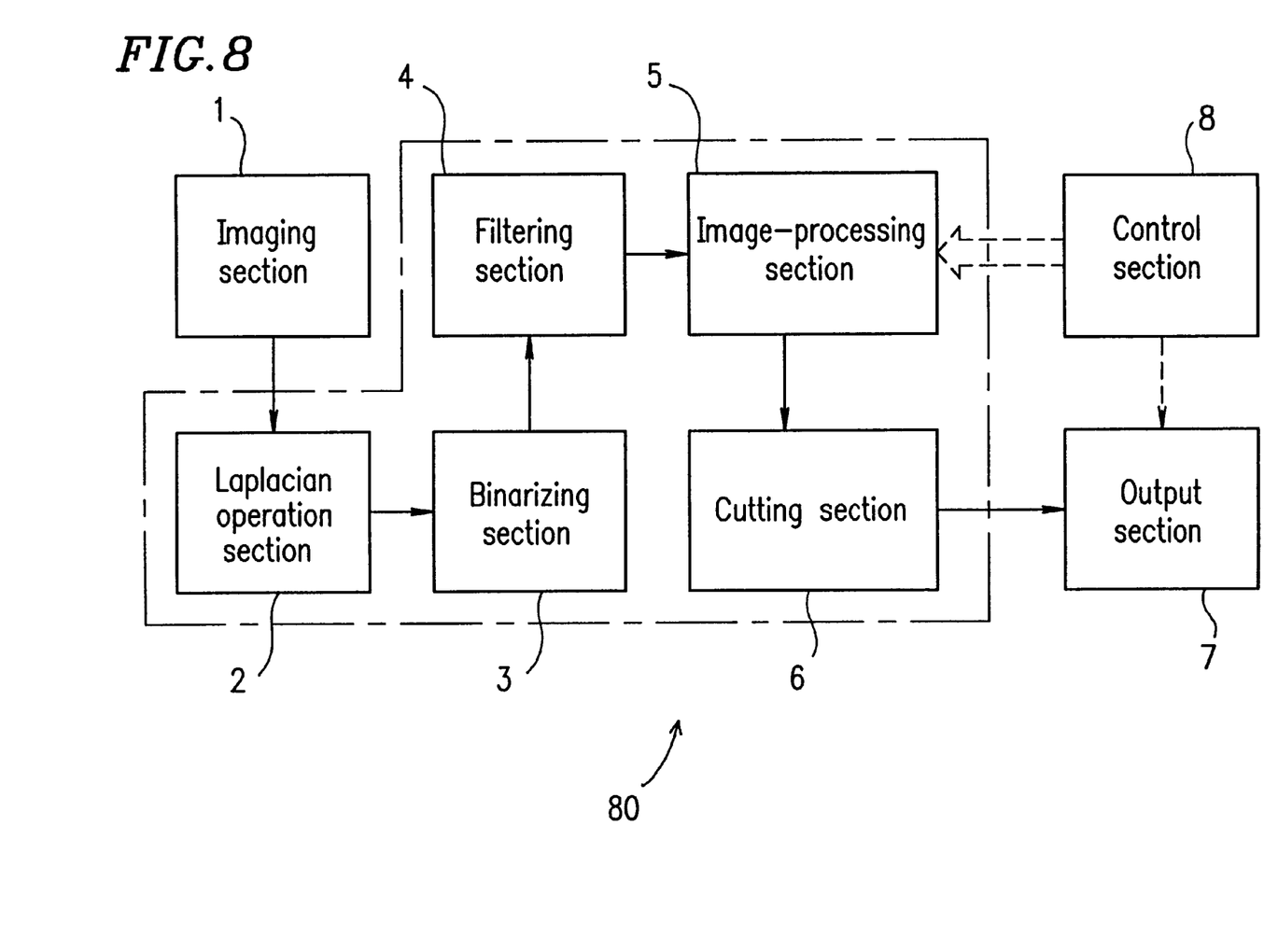
FIG. 8 is a diagram showing a character extracting apparatus according to Example 2 of the present invention.

The character extracting apparatus 80 in FIG. 8 includes a filtering section 4, an image processing section 5, an output section 7 and a control section 8, in addition to the components of the character extracting apparatus 50. More specifically, the filtering section 4 calculates a binarized image $I_f$ filtered by a minimum filter. The image processing section 5 performs a process such as the process of calculating a logic product, an expansion process and/or a contraction process of the image. The output section 7 outputs the resultant cut-out image as image data. The control section 8 controls the operation of the character extracting apparatus 80.

Figure 9A:
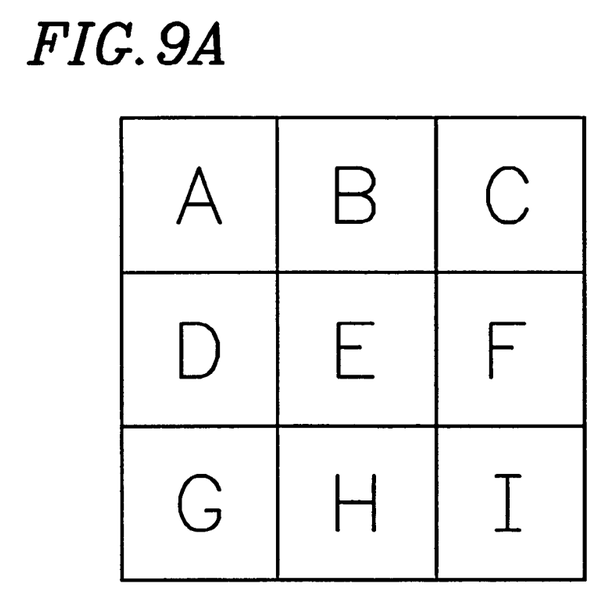
FIG. 9A is a diagram showing an operation region of a high-speed image processing chip SALA (trade name of Sharp Kabushiki Kaisha)

It should be noted that the Laplacian operation section 2, the binarizing section 3, the filtering section 4, the image processing section 5 and the cutting section 6 are implemented by, for example, a general purpose image processing board GPB made by Sharp Kabushiki Kaisha. This general-purpose image processing board GPB includes a high-speed image processing chip SALA (trade name of Sharp Kabushiki Kaisha) as a main component. As shown in FIG. 9A, the size of an operation region is limited to 3×3 in SALA in order to achieve a high-speed operation.

Figure 9B:
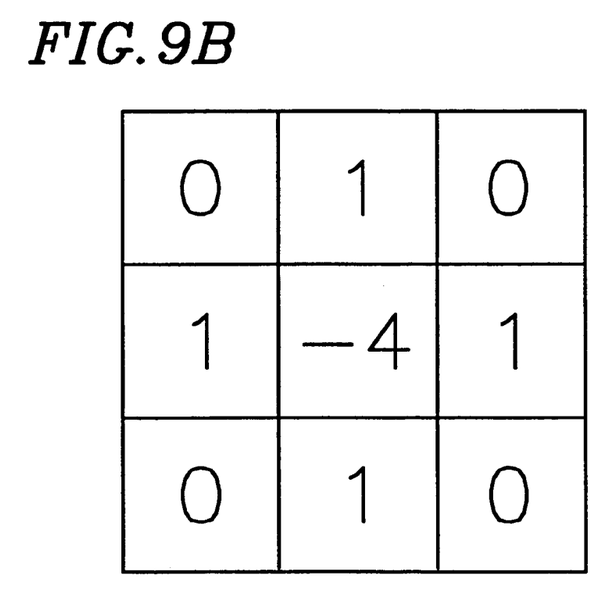
FIG. 9B is a diagram showing a 3×3 Laplacian operator.
Figure 10:
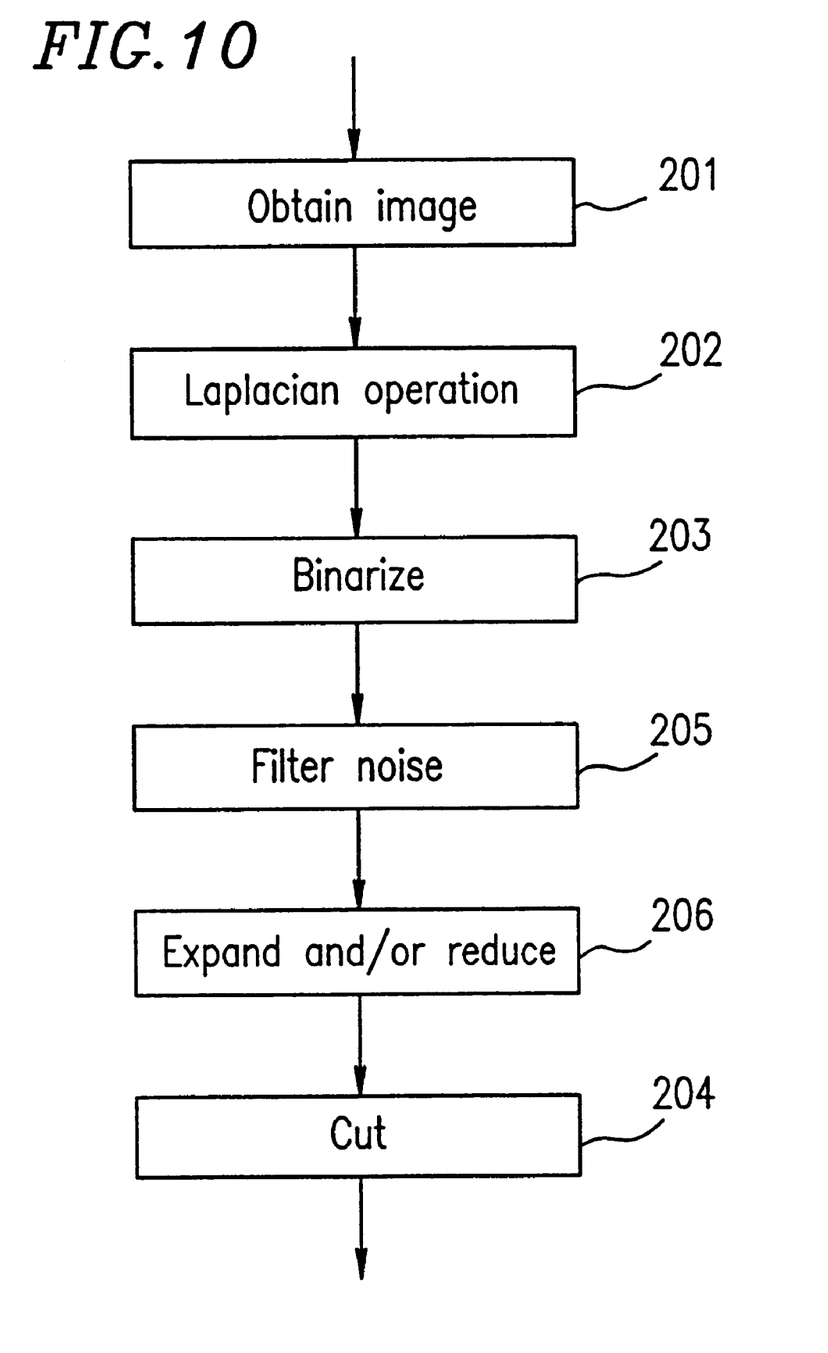
FIG. 10 is a flow chart illustrating a character extracting method according to Example 2 of the present invention.

FIG. 9A shows an operation region of SALA. The letters A, B, . . . , H, I in FIG. 9A represent pixel values (e.g. gray level) corresponding to the respective pixel positions. FIG. 9B shows values of a 3×3 Laplacian operator.

This Laplacian operator, that is, the Laplacian operation section 2 in FIG. 8 applies a Laplacian operation to the original image, i.e., to the character image provided from the imaging section 1. The Laplacian operation result $I_1$ is given by the following expression (8):

$$I_1[i][j]=B+D+F+H-4E \quad (8)$$

where (i, j) is a pixel position at E in FIG. 9A.

The Laplacian operation result $I_1$ is provided to the binarizing section 3. Then, the binarized section 3 binarizes the result $I_1$ according to the following expression (9) to obtain a binarized image $I_b$:

$$I_b[i][j] = \begin{cases} 0; & \nabla^2 I_0[i][j] \geq 0 \\ 255; & \nabla^2 I_0[i][j] < 0 \end{cases} \quad (9)$$

where (i, J) is a pixel position at E in FIG. 9A.

The obtained binarized image $I_b$ is provided to the filtering section 4. Then, the filtering section 4 applies a filtering process to the binarized image $I_b$ according to the following expression (10). As a result, an image $I_f$ in which a noise region has been filtered is obtained.

$$I_f[i][j]=\min\{A,B,D,E\} \quad (10)$$

In the above expression (10), (i, j) is a pixel position at E in FIG. 9A.

Thereafter, the filtering section 4 applies such a filtering process to all of the pixels in the binarized image, and provides the resultant image data in which noise has been filtered to the image processing section 5. Then, the image processing section 5 performs a process such as a process of calculating a logic product, an expansion process and/or a contraction process of the image in order to improve the character recognition ratio. Thereafter, the image processing section 5 provides the resultant image data to the cutting section 6. The cutting section 6 separates and cuts the image data provided by the image processing section 5 on a character-by-character basis. The resultant character(s) is output from the output section 7 to a character recognition section (not shown).

Hereinafter, a method for cutting out a character by the character extracting apparatus 80 according to Example 2 will be described with reference to FIGS. 3A through 3I and FIG. 10. More specifically, an example in which the character extracting apparatus 80 cuts out a character(s) on a wafer will be described.

Figure 3A:
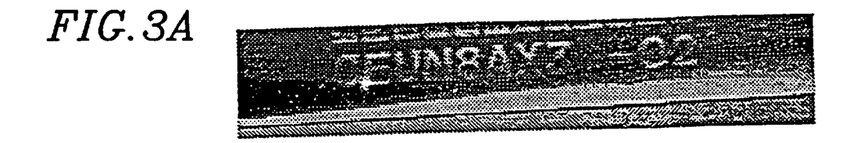
FIG. 3A shows an original image.

FIG. 3A shows an original image of a character region on a wafer. In Step 201 of FIG. 10, the original image is provided to the character extracting apparatus 80. The image data has 256 gradation levels (a level 0 corresponds to black, and a level 255 corresponds to white). In order to reduce the size of an unnecessary region as much as possible, the illumination apparatus and the imaging camera of the imaging section 1 are set so that a screen frame of the imaging camera corresponds to a region including a character(s).

Figure 3B:
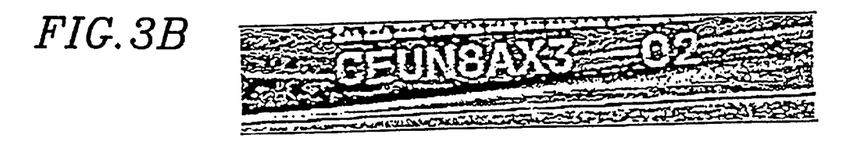
FIG. 3B shows an image resulting from applying the Laplacian operation and the binarizing process to the original image.

In Step 202, the Laplacian operation section 2 performs a Laplacian operation. In Step 203, the binarizing section 3 binarizes the Laplacian operation result. FIG. 3B shows the binarized image, that is, the image resulting from the Laplacian operation of the Laplacian operation section 2 and the binarizing process of the binarizing section 3. Since Step 203 of Example 2 is the same as Step 203 of Example 1, detailed description thereof will be omitted.

Figure 3C:
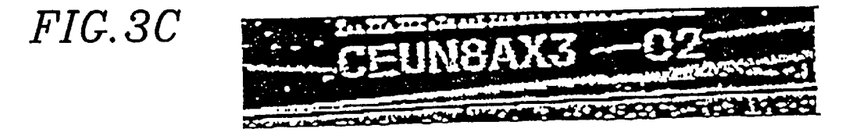
FIG. 3C shows an image resulting from filtering the image shown in FIG. 3B by a minimum filter.

In Step 205, the filtering section 4 filters an image having been subjected to the Laplacian operation and the binarized process, such as the image shown in FIG. 3B. The filtering section 4 applies the above-mentioned minimum-filtering process to a small noise-region present in the image shown in FIG. 3B, thereby filtering or cutting the noise from the character region. FIG. 3C shows an image resulting from such a filtering process.

Figure 3D:
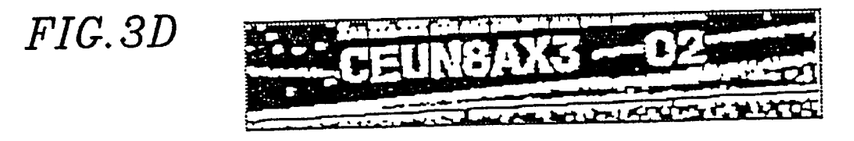
FIG. 3D shows an image resulting from expanding the image shown in FIG. 3C.

In Step 206, the image processing section 5 applies an expansion process and/or a contraction process to the filtered image. The image processing section 5 may calculate a logic product of the expanded and/or contracted image and the filtered image. FIG. 3D shows an image resulting from expanding the binarized image of FIG. 3C by the image processing section 5 so that each of the remaining unnecessary regions are connected to each other. Such an expansion process may disadvantageously bring the characters into contact with each other or may disadvantageously bring the character region and the noise region into contact with each other. However, such a disadvantage can be easily eliminated by calculating a logic product of the above-mentioned two images.

In Step 204, the cutting section 6 cuts out a character(s) output from the image processing section 5 on a character-by-character basis. Thereafter, the resultant character(s) is sent to the output section 7.

The character extracting apparatus 80 according to Example 2 may additionally perform the following process.

Figure 3E:
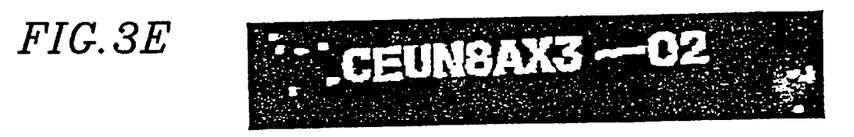
FIG. 3E shows an image resulting from removing a region of the binarized image in FIG. 3D which is in contact with a screen frame.

As shown in FIG. 3E, an unnecessary region which is in contact with a frame having a prescribed size is removed from the image shown in FIG. 3D.

Figure 3F:
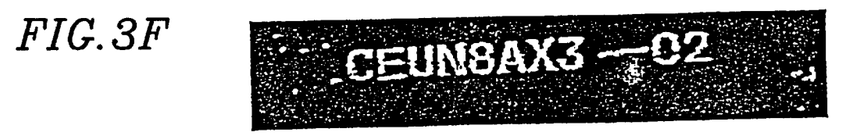
FIG. 3F shows an image resulting from calculating a logic product of the images shown in FIGS. 3C and 3E.

Moreover, a logic product of the images shown in FIGS. 3C and 3E may be calculated in order to eliminate the above-mentioned disadvantage caused by the expansion process. FIG. 3F shows an image resulting from such a process.

Figure 3G:
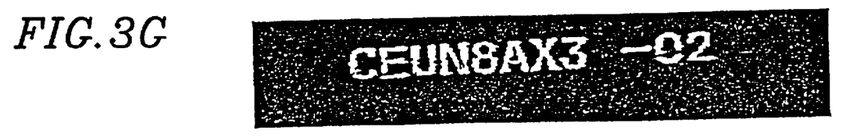
FIG. 3G shows an image resulting from removing a small region of the image in FIG. 3F using an area threshold.

Furthermore, in order to remove the noise remaining in the image shown in FIG. 3F, the image processing section 5 may remove a region having an area smaller than a prescribed threshold. FIG. 3G shows an image resulting from such a process.

The prescribed threshold can be easily determined from the font of a character(s) of interest and a character set. A character set in the present example consists of capital letters, numerals, and a hyphen ("-"). According to the font of these characters, a character having the smallest area is the hyphen. Therefore, the number of pixels in the area of the character "-" is used as the threshold. However, there may be a case where a character of interest is incomplete or deformed. Therefore, the threshold is preferably set to a value corresponding to two-thirds of the area of the character "-".

Figure 3H:
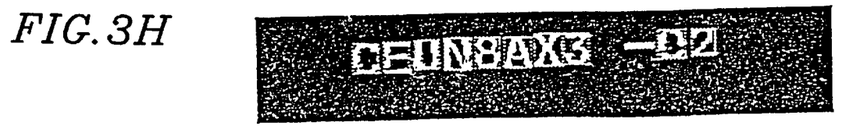
FIG. 3H shows an image resulting from separating a character region of the image in FIG. 3G on a character-by-character basis.

The cutting section 6 may separate the image shown in FIG. 3G on a character-by-character basis, using, for example, a projection histogram. The projection histogram is described in the above-cited reference "Primer for Computer Image Processing", pp. 110–113, which is herein incorporated by reference for illustrating the projection histogram. FIG. 3H shows an image resulting from such a process. As shown in FIG. 3H, each character is located in a corresponding one of the separated character regions (defined by the broken line in the figure). It should be noted that there exist deformed characters in the image shown in FIG. 3H. It should be noted that the separated character regions are temporarily obtained by, for example, the projection histogram.

Figure 3I:
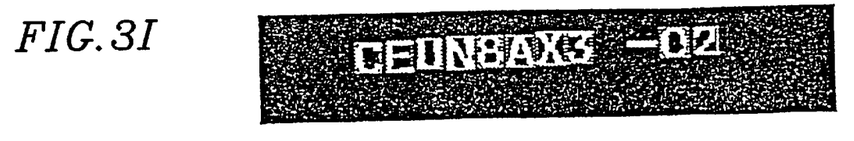
FIG. 3I shows an image resulting from expanding and/or contracting the image in FIG. 3H.

In order to improve the recognition ratio of the deformed characters in the image shown in FIG. 3H, the image processing section 5 may apply an expansion process and/or a contraction process to shape the deformed characters, that is, to repair the image. FIG. 3I shows the repaired image. It should be noted that those characters that are not deformed can also be shaped by the expansion and/or the contraction process.

The expansion process and/or the contraction process may disadvantageously bring the characters into contact with each other. Therefore, the image will not be newly separated on a character-by-character basis, but the separated regions shown in FIG. 3H are used. Then, the final image, that is, the image shown in FIG. 3I is output to the character recognition section.

It should be noted that, although noise is filtered by the minimum-filtering operation performed by the filtering section 4, an AND operation or a mean-value operation can alternatively be used as the filtering process.

According to a conventional method for separating an image based on edge information, only an edge is extracted or the sharpness of an original image is reduced by a Gaussian function. As a result, the following problems will occur:

(1) In the field of factory automation, character edges and noise edges are mixed in most images to be recognized, and moreover, most character edges are not clear. When only an edge region is to be extracted, a character edge is not completely extracted. Therefore, it is very difficult to distinguish a character edge from a noise edge; and (2) It is difficult to estimate an optimal value σ of the Gaussian function. Therefore, when the sharpness of the original image is reduced by the Gaussian function, the difference between the background and the character(s) will become less clear. Moreover, the characters will be brought into contact with each other, or the character region and the noise region will be brought into contact with each other. As a result, the character deformation or the like will occur when the noise is picked up, depending upon a width σ of the Gaussian function, that is, a spatial constant of the Gaussian function.

On the other hand, a character extracting method according to the present invention includes the steps of applying a Laplacian operation to the original image, and binarizing the Laplacian operation result. More specifically, the character extracting method of the present invention includes not only the Laplacian operation step of applying partial differentiation to the original image twice, but also the step of binarizing the Laplacian operation result. Therefore, noise included in the original image will not be emphasized.

As a result, a character region can be precisely cut out from an image having a large amount of noise in the production environment such as factory automation.

Accordingly, the character extracting method of the present invention can significantly reduce misrecognition resulting from an inaccurately extracted character region, as compared to the conventional methods. As a result, the character recognition ratio can be improved. Moreover, the present invention can be implemented by a highly simple algorithm as shown in the above-described examples. Therefore, the present invention can be used in, for example, a production line in which a higher-speed process is required.

Moreover, noise can be filtered by performing a filtering process. Accordingly, the character region can be cut out more precisely.

Furthermore, any of the various image processing techniques such as an expansion process, a contraction process and a logic product operation of images may additionally be used, whereby the character region can be much more precisely cut out.

Furthermore, a Laplacian operation may be performed utilizing a variety of concave and convex properties rather than utilizing the edges.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A character extracting method, comprising the steps of:
   obtaining an image of a specific region;
   applying a Laplacian operation to the obtained image to determine the presence of a convex property or a concave property of a gray level profile associated with a character-drawn portion;
   binarizing the image resulting from the Laplacian operation; and
   separating and cutting a character on a character-by-character basis based on the binarized image.

2. A character extracting method according to claim 1, wherein in the binarizing step,
   in a case where a portion where a character to be cut out is drawn has a convex property,
   $I_b[i, j]$ is a first value when $\nabla^2 I_0[i, j] \geq 0$, and $I_b[i, j]$ is a second value when $\nabla^2 I_0[i, j] < 0$; and
   in a case where the portion where the character to be cut out has a concave property,
   $I_b[i, j]$ is the first value when $\nabla^2 I_0[i, j] \leq 0$, and $I_b[i, j]$ is the second value when $\nabla^2 I_0[i, j] > 0$,
   where $\nabla^2$ represents a Laplacian operator; $[i, j]$ represents a pixel position in the image; $I_0[i, j]$ represents a pixel value corresponding to the pixel position $[i, j]$; and $I_b[i, j]$ represents a binarized pixel-value corresponding to a pixel value $I_0[i, j]$.

3. A character extracting method according to claim 2, wherein
   the first value corresponds to a level 0, and the second value corresponds to a level 255.

4. A character extracting method according to claim 2, wherein
   the convex property indicates such a property that the portion where the character to be cut out is drawn becomes brighter toward the center thereof, and
   the concave property indicates such a property that the portion where the character to be cut out is drawn becomes darker toward the center thereof.

5. A character extracting method according to claim 1, further comprising, after the binarizing step, the step of:
   filtering noise from the binarized image.

6. A character extracting method according to claim 5, wherein
   the step of filtering the noise from the binarized image uses an arbitrary pixel and a pixel adjacent to the arbitrary pixel in the binarized image to filter the noise from the arbitrary pixel.

7. A character extracting method according to claim 6, wherein the step of filtering the noise from the binarized image filters the noise by applying a minimum filter to a region having the arbitrary pixel and the adjacent pixel.

8. A character extracting method according to claim 6, wherein the step of filtering the noise from the binarized image filters the noise by applying an AND operation to a region having the arbitrary pixel and the adjacent pixel.

9. A character extracting method according to claim 6, wherein the step of filtering the noise from the binarized image filters the noise by applying a mean-value operation to a region having the arbitrary pixel and the adjacent pixel.

10. A character extracting method according to claim 5, further comprising, after the step of filtering the noise from the binarized image, the step of:

conducting an expansion process and/or a contraction process in order to shape a deformed character and/or to fill a hole which is present in the portion where the character to be cut out is drawn.

11. A character extracting method according to claim 10, further comprising, prior to the step of conducting the expansion process and/or the contraction process, the step of:

determining an outer frame of the character to be cut out.

12. A character extracting method according to claim 10, further comprising the step of:

calculating a logic product of an image resulting from the step of conducting the expansion process and/or the contraction process and an image resulting from the step of filtering the noise from the binarized image.

13. A character extracting apparatus, comprising the steps of:

an imaging section for obtaining an image of a specific region;

a Laplacian operation section for applying a Laplacian operation to the obtained image to determine the presence of a convex property or a concave property of a gray level profile associated with a character-drawn portion;

a binarizing section for binarizing the image resulting from the Laplacian operation; and a cutting section for separating and cutting a character on a character-by-character basis based on the binarized image.

14. A character extracting apparatus according to claim 13, wherein the binarizing section binarizes the image resulting from the Laplacian operation as follows:

in a case where a portion where a character to be cut out is drawn has a convex property, $I_b[i, j]$ is a first value when $\nabla^2 I_0[i, j] \geq 0$, and $I_b[i, j]$ is a second value when $\nabla^2 I_0[i, j] < 0$; and in a case where the portion where the character to be cut out has a concave property, $I_b[i, j]$ is the first value when $\nabla^2 I_0[i, j] \leq 0$, and $I_b[i, j]$ is the second value when $\nabla^2 I_0[i, j] > 0$, where $\nabla^2$ represents a Laplacian operator; $[i, j]$ represents a pixel position in the image; $I_0[i, j]$ represents a pixel value corresponding to the pixel position $[i, j]$; and $I_b[i, j]$ represents a binarized pixel-value corresponding to a pixel value $I_0[i, j]$.

15. A character extracting apparatus according to claim 14, wherein the first value corresponds to a level 0, and the second value corresponds to a level 255.

16. A character extracting apparatus according to claim 14, wherein the convex property indicates such a property that the portion where the character to be cut out is drawn becomes brighter toward the center thereof, and the concave property indicates such a property that the portion where the character to be cut out is drawn becomes darker toward the center thereof.

17. A character extracting apparatus according to claim 13, further comprising:

a filter for filtering noise from the binarized image.

18. A character extracting apparatus according to claim 17, wherein the filter uses an arbitrary pixel and a pixel adjacent to the arbitrary pixel in the binarized image to filter the noise from the arbitrary pixel.

19. A character extracting apparatus according to claim 18, wherein the filter filters the noise by applying a minimum filter to a region having the arbitrary pixel and the adjacent pixel.

20. A character extracting apparatus according to claim 18, wherein the filter filters the noise by applying an AND operation to a region having the arbitrary pixel and the adjacent pixel.

21. A character extracting apparatus according to claim 18, wherein the filter filters the noise by applying a mean-value operation to a region having the arbitrary pixel and the adjacent pixel.

22. A character extracting apparatus according to claim 17, further comprising:

an image processing section for calculating a logic product of an image provided by an expansion process and/or a contraction process and an image output from the filter.

* * * * *